(12) United States Patent
Masuko

(10) Patent No.: US 9,514,299 B2
(45) Date of Patent: Dec. 6, 2016

(54) INFORMATION PROCESSING DEVICE, METHOD FOR CONTROLLING INFORMATION PROCESSING DEVICE, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/781,035

(22) PCT Filed: Mar. 29, 2013

(86) PCT No.: PCT/JP2013/059772
§ 371 (c)(1),
(2) Date: Sep. 29, 2015

(87) PCT Pub. No.: WO2014/155749
PCT Pub. Date: Oct. 2, 2014

(65) Prior Publication Data
US 2016/0063236 A1    Mar. 3, 2016

(51) Int. Cl.
*G06F 21/00* (2013.01)
*G06F 21/36* (2013.01)
(Continued)

(52) U.S. Cl.
CPC .............. *G06F 21/36* (2013.01); *G06F 3/041* (2013.01); *G06F 3/0488* (2013.01);
(Continued)

(58) Field of Classification Search
CPC .......... G06F 21/31; G06F 21/36; G06F 3/041; G06F 3/0488
See application file for complete search history.

(56) References Cited

U.S. PATENT DOCUMENTS

2010/0306718 A1* 12/2010 Shim ................... G06F 3/04883
715/863

FOREIGN PATENT DOCUMENTS

| JP | 2012-146153 A | 8/2012 |
| JP | 2013-016115 A | 1/2013 |
| WO | 2011/043422 A1 | 4/2011 |

OTHER PUBLICATIONS

English Translation of International Search Report for PCT/JP2013/059772 dated Apr. 23, 2013.
(Continued)

*Primary Examiner* — Jeffrey Pwu
*Assistant Examiner* — Thong Truong
(74) *Attorney, Agent, or Firm* — Hubbs, Enatsky & Inoue PLLC

(57) ABSTRACT

Authentication data indicates a plurality of types of operation which a user should perform in a predetermined order via a touch panel and a number of fingers, as to each one of the plurality of types of operation, with which the user should touch the touch panel when performing an operation corresponding to the one of the plurality of types of operation. An authentication processing execution unit executes authentication processing by determining, based on a result of detection by the touch panel, whether or not an operation corresponding to each of the plurality of types of operation has been performed in the predetermined order by touching the touch panel with a number of fingers set for each of the plurality of types of operation.

11 Claims, 12 Drawing Sheets

(51) Int. Cl.
  *G06F 21/31* (2013.01)
  *G06F 3/041* (2006.01)
  *G06F 3/0488* (2013.01)
  *H04M 1/67* (2006.01)

(52) U.S. Cl.
  CPC .......... *G06F 3/04883* (2013.01); *G06F 21/31* (2013.01); *H04M 1/67* (2013.01); *G06F 2203/04104* (2013.01); *G06F 2203/04808* (2013.01)

(56) References Cited

OTHER PUBLICATIONS

Takashi Sawamura, "A proposal of an authentication method using multi-touch screen", Computer Security Symposium (CSS2010) 2010 Ronbunshu, Oct. 12, 2010, vol. 2010, p. 645 to 650. See ISR.

\* cited by examiner

| ORDER | TYPE OF OPERATION | NUMBER OF FINGERS | MOVEMENT DIRECTION | PERIOD OF TOUCH TIME |
|---|---|---|---|---|
| 1 | SWIPE OPERATION | 1 | SHORTER SIDE DIRECTION | |
| 2 | TAPPING OPERATION | 2 | | |
| 3 | SWIPE OPERATION | 3 | LONGITUDINAL DIRECTION | |
| 4 | TAPPING OPERATION | 4 | | |
| 5 | LONG PRESS OPERATION | 3 | | ONE SECOND |

FIG.6

| ORDER | TYPE OF OPERATION | NUMBER OF FINGERS | MOVEMENT DIRECTION | PERIOD OF TOUCH TIME |
|---|---|---|---|---|
| 1 | TAPPING OPERATION | 1 | | |
| 2 | TAPPING OPERATION | 2 | | |
| 3 | TAPPING OPERATION | 4 | | |
| 4 | TAPPING OPERATION | 3 | | |
| 5 | TAPPING OPERATION | 5 | | |

FIG.7

| ORDER | TYPE OF OPERATION | NUMBER OF FINGERS | MOVEMENT DIRECTION | PERIOD OF TOUCH TIME |
|---|---|---|---|---|
| 1 | SWIPE OPERATION | 3 | SHORTER SIDE DIRECTION | |
| 2 | SWIPE OPERATION | 2 | LONGITUDINAL DIRECTION | |
| 3 | SWIPE OPERATION | 5 | SHORTER SIDE DIRECTION | |
| 4 | SWIPE OPERATION | 1 | LONGITUDINAL DIRECTION | |

FIG.15

| ORDER | TYPE OF OPERATION | NUMBER OF FINGERS | MOVEMENT DIRECTION | PERIOD OF TOUCH TIME |
|---|---|---|---|---|
| 1 | SWIPE OPERATION | 2 | PARALLEL DIRECTION | |
| 2 | TAPPING OPERATION | 2 | | |
| 3 | SWIPE OPERATION | 3 | ORTHOGONAL DIRECTION | |
| 4 | TAPPING OPERATION | 4 | | |
| 5 | LONG PRESS OPERATION | 3 | | ONE SECOND |

| ORDER | OPERATION INTERVAL | TYPE OF OPERATION | NUMBER OF FINGERS | MOVEMENT DIRECTION | PERIOD OF TOUCH TIME |
|---|---|---|---|---|---|
| 1 |  | SWIPE OPERATION | 1 | SHORTER SIDE DIRECTION |  |
| 2 | ΔT1 | TAPPING OPERATION | 2 |  |  |
| 3 | ΔT2 | SWIPE OPERATION | 3 | LONGITUDINAL DIRECTION |  |
| 4 | ΔT3 | TAPPING OPERATION | 4 |  |  |
| 5 | ΔT4 | LONG PRESS OPERATION | 3 |  | ONE SECOND |

INFORMATION PROCESSING DEVICE, METHOD FOR CONTROLLING INFORMATION PROCESSING DEVICE, PROGRAM, AND INFORMATION STORAGE MEDIUM

CROSS REFERENCE TO RELATED APPLICATIONS

This application is a National Stage of International Application No. PCT/JP2013/059772 filed on Mar. 29, 2013. The contents of the above document is incorporated herein by reference in its entirety.

TECHNICAL FIELD

The present invention relates to an information processing device, a method for controlling an information processing device, a program, and an information storage medium.

BACKGROUND ART

There has been known an information processing device equipped with a touch panel. Such an information processing device can be locked in order to prevent use by others, and a user can unlock the device via the touch panel.

For example, in a device described in Patent Literature 1, when a line inputted by tracing, on a touch panel, the nine points arranged in matrix displayed on a screen coincides with the line registered in advance, the lock is released.

CITATION LIST

Patent Literature

Patent Literature 1: JP 2013-016115 A

SUMMARY OF INVENTION

Technical Problem

However, in the device described in Patent Literature 1, as it is necessary to trace the points to input a line, it is necessary to see the screen when unlocking, which a user may find troublesome.

The present invention has been conceived in view of the above, and aims to provide an information processing device, a method for controlling an information processing device, a program, and an information storage medium being able to make it possible for a user to perform an authentication operation without seeing a screen, and being able to ensure required authentication strength.

Solution to Problem

In order to achieve the above described object, an information processing device according to the present invention includes a touch panel capable of detecting a plurality of positions touched by a user; means for referring to authentication data stored in authentication data storage means for storing data as authentication data, the data indicating a plurality of types of operation which the user should perform in a predetermined order via the touch panel and a number of fingers, as to each one of the plurality of types of operation, with which the user should touch the touch panel when performing an operation corresponding to the one of the plurality of types of operation; and authentication processing execution means for executing authentication processing by determining, based on a result of detection by the touch panel, whether or not an operation corresponding to each of the plurality of types of operation has been performed in the predetermined order by touching the touch panel with a number of fingers set for each of the plurality of types of operation.

A method for controlling an information processing device according to the present invention includes a step of obtaining a result of detection by a touch panel capable of detecting a plurality of positions touched by a user; a step of referring to authentication data stored in authentication data storage means for storing data as authentication data, the data indicating a plurality of types of operation which the user should perform in a predetermined order via the touch panel and a number of fingers, as to each one of the plurality of types of operation, with which the user should touch the touch panel when performing an operation corresponding to the one of the plurality of types of operation; and an authentication processing execution step of executing authentication processing by determining, based on the result of detection by the touch panel, whether or not an operation corresponding to each of the plurality of types of operation has been performed in the predetermined order by touching the touch panel with a number of fingers set for each of the plurality of types of operation.

A program according to the present invention is a program for causing a computer to function as: means for obtaining a result of detection by a touch panel capable of detecting a plurality of positions touched by a user; means for referring to authentication data stored in authentication data storage means for storing data as authentication data, the data indicating a plurality of types of operation which the user should perform in a predetermined order via the touch panel and a number of fingers, as to each one of the plurality of types of operation, with which the user should touch the touch panel when performing an operation corresponding to the one of the plurality of types of operation; and authentication processing execution means for executing authentication processing by determining, based on the result of detection by the touch panel, whether or not an operation corresponding to each of the plurality of types of operation has been performed in the predetermined order by touching the touch panel with a number of fingers set for each of the plurality of types of operation.

An information storage medium according to the present invention is a computer readable information storage medium that stores a program for causing a computer to function as: means for obtaining a result of detection by a touch panel capable of detecting a plurality of positions touched by a user; means for referring to authentication data stored in authentication data storage means for storing data as authentication data, the data indicating a plurality of types of operation which the user should perform in a predetermined order via the touch panel and a number of fingers, as to each one of the plurality of types of operation, with which the user should touch the touch panel when performing an operation corresponding to the one of the plurality of types of operation; and authentication processing execution means for executing authentication processing by determining, based on the result of detection by the touch panel, whether or not an operation corresponding to each of the plurality of types of operation has been performed in the predetermined order by touching the touch panel with a number of fingers set for each of the plurality of types of operation.

In one embodiment of the present invention, the authentication data may further indicate, as to at least one of the plurality of types of operation, a direction in which the user should move one or more fingers touching the touch panel when performing an operation corresponding to each of the at least one of the plurality of types of operation, and the authentication processing execution means may include means for executing the authentication processing, when determining whether or not an operation corresponding to a type of operation for which the direction is set has been performed, by determining whether or not the operation corresponding to the type of operation has been performed by touching the touch panel with a number of fingers set for the type of operation and moving the one or more fingers touching the touch panel in a direction corresponding to the direction set for the type of operation.

In one embodiment of the present invention, the authentication data may further indicate a direction in which the user should move a plurality of fingers touching the touch panel when performing an operation corresponding to the type of operation with a relative direction with respect to a direction in which the plurality of fingers touching the touch panel are aligned.

In one embodiment of the present invention, the authentication data may further indicate, as to at least one of the plurality of types of operation, a period of time during which the user should keep touching the touch panel with one or more fingers when performing an operation corresponding to each of the at least one of the plurality of types of operation, and the authentication processing execution means may include means for executing authentication processing, when determining whether or not an operation corresponding to a type of operation for which the period of time is set has been performed, by determining whether or not the operation corresponding to the type of operation has been performed by touching the touch panel with a number of fingers set for the type of operation and keeping touching the touch panel with the one or more fingers for a period of time corresponding to the period of time set for the type of operation.

In one embodiment of the present invention, the authentication data may further indicate a reference operation interval of when the user performs an operation corresponding to each of the plurality of types of operation, and the authentication processing execution means may include means for executing the authentication processing by determining whether or not the operation corresponding to each of the plurality of types of operation have been performed at an operation interval corresponding to the reference operation interval.

In one embodiment of the present invention, the plurality of types of operation which the user should perform in the predetermined order via the touch panel may include at least one of a tapping operation, a swipe operation, and a long press operation.

In one embodiment of the present invention, the information processing device may further include means for encouraging the user to set the authentication data by performing an operation via the touch panel; first obtaining means for obtaining a plurality of types of operation which the user has performed via the touch panel, based on the result of detection by the touch panel; second obtaining means for obtaining, as to each one of the plurality of types of operation which the user has performed via the touch panel, a number of fingers with which the user was touching the touch panel when performing an operation corresponding to the one of the plurality of types of operation, based on the result of detection by the touch panel; and means for setting the authentication data, based on content obtained by the first obtaining means and the second obtaining means.

In one embodiment of the present invention, it may be possible to set a tapping operation or a swipe operation as a type of operation which the user should perform via the touch panel, and the information processing device may further include means for encouraging the user to perform the tapping operation, using a predetermined number of fingers, means for obtaining a number of touch positions detected by the touch panel, comparison means for comparing the predetermined number and the number of touch positions detected by the touch panel, and means for encouraging the user to set the swipe operation with priority over the tapping operation as the type of operation which the user should perform via the touch panel, based on a result of comparison by the comparison means.

In one embodiment of the present invention, it may be possible to set a tapping operation as a type of operation which the user should perform via the touch panel, and the information processing device may further include means for encouraging the user to perform the taping operation, using a predetermined number of fingers, means for obtaining a number of touch positions detected by the touch panel, comparison means for comparing the predetermined number and the number of touch positions detected by the touch panel, and means for restraining the tapping operation from being set as the type of operation which the user should perform via the touch panel, based on a result of comparison by the comparison means.

Advantageous Effects of Invention

According to the present invention, it is possible to make it possible for a user to perform an authentication operation without seeing a screen, and it is also possible to ensure required authentication strength.

BRIEF DESCRIPTION OF DRAWINGS

FIG. 6 shows another example of authentication data;

FIG. 7 shows another example of authentication data;

FIG. 15 shows another example of authentication data;

DESCRIPTION OF EMBODIMENTS

In the following, an example of an embodiment of the present invention will be described in detail, based on the drawings.

An information processing device according to an embodiment of the present invention is implemented using, for example, a mobile information terminal, a portable phone, a portable game device, a personal computer, or the like. In the following, a case in which an information processing device 10 according to this embodiment is implemented using a mobile information terminal (a tablet computer) will be described.

Figure 1:
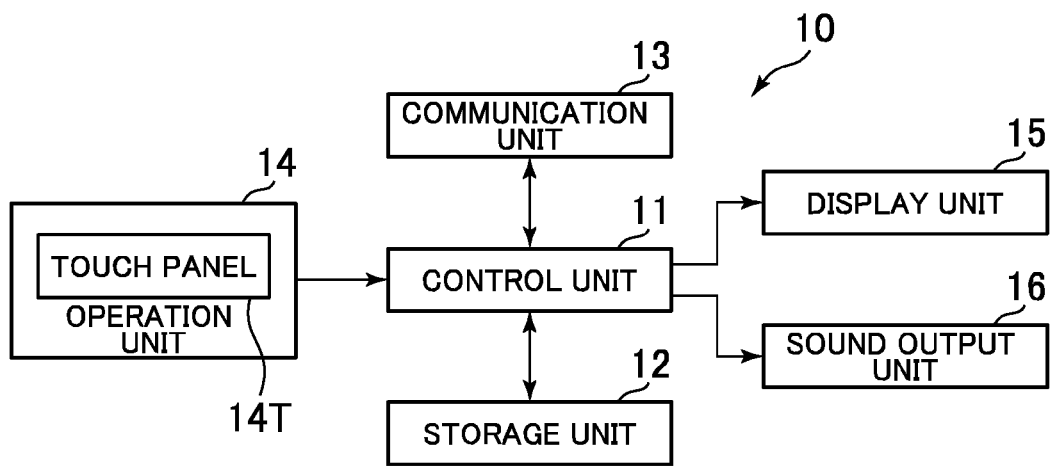
FIG. 1 shows one example of a hardware structure of an information processing device according to an embodiment of the present invention.
Figure 2:
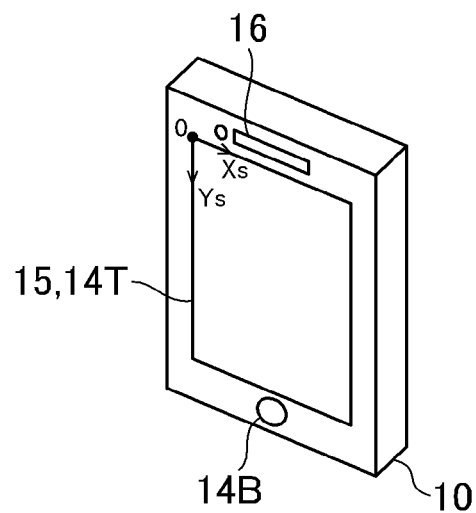
FIG. 2 shows one example of the external appearance of an information processing device.

FIG. 1 shows one example of a hardware structure of the information processing device 10 according to this embodiment; FIG. 2 shows one example of the external appearance of the information processing device 10 according to this embodiment. As shown in FIG. 1, the information processing device 10 includes a control unit 11, a storage unit 12, a communication unit 13, an operation unit 14, a display unit 15, and a sound output unit 16. The control unit 11 includes, for example, one or more microprocessors, and executes information processing according to an operating system or a program stored in the storage unit 12. The storage unit 12 includes a main storage unit (for example, a RAM) and an auxiliary storage unit (for example, a hard disk or a solid state drive).

The communication unit 13 is for carrying out data communication with other devices via a communication network. A program and data are supplied to the storage unit 12 of the information processing device 10 via a communication network. Note that the information processing device 10 may include a structural component for reading a program or data stored in an information storage medium such as a memory card, an optical disk, or the like. Then, the program or data read from the information storage medium may be stored in the storage unit 12.

The operation unit 14 is used by a user to perform an operation. For example, the operation unit 14 includes a button 14B provided on the surface of the information processing device 10 (see FIG. 2). Note that the operation unit 14 may include an operation member (for example, a stick, a lever, or the like) other than the button 14B.

Further, the operation unit 14 includes a designated position detection unit for detecting a position designated by a user within the screen of the display unit 15. For example, the operation unit 14 includes a touch panel 14T formed overlapping the display unit 15. The touch panel 14T is a typical touch panel, and can detect a plurality of positions touched by a user. As the touch panel 14T, an electrostatic capacitive type touch panel is used, for example. In an electrostatic capacitive type touch panel, one or more positions being touched by a user are detected, based on change in charge that arises when the user touches the surface of the touch panel. Note that a touch panel employing other methods may be used instead as the touch panel 14T. Further, the touch panel 14T may be formed integrally with a liquid crystal display (the display unit 15).

Information indicating a position being touched by a user is supplied to the control unit 11 every predetermined period of time (for example, $1/60^{th}$ of a second). A position being touched by a user is expressed by means of coordinate values of a screen coordinate system, for example. Note that a "screen coordinate system" is a coordinate system, in which the upper left vertex is defined as the origin O, the shorter side direction is defined as the Xs axial direction, and the longitudinal direction is defined as the Ys axial direction, in the arrangement as shown in FIG. 2, for example. The control unit 11 obtains the position being touched by a user, based on the information supplied from the touch panel 14T.

The display unit 15 is a liquid crystal display, an organic EL display, or the like, for example; the sound output unit 16 is a speaker, a headphone terminal, or the like, for example.

In the information processing device 10 according to this embodiment, a combination of types of operation which a user should sequentially perform can be set as authentication data instead of a normal password.

A combination of types of operation is set including at least one of a plurality of types of operation performed via the touch panel 14T. For example, a combination of types of operation is set including at least one of a tapping operation, a swipe operation, and a long press operation.

Note that a "tapping operation" refers to an operation of lightly hitting the touch panel 14T with a fingertip. A "swipe operation" refers to an operation of sliding (moving) a finger while it is lightly touching the touch panel 14T. In case of a swipe operation, the position being touched by a user moves.

Further, a "long press operation" refers to an operation of having one or more fingers continuously touch one or more fixed positions (or one or more substantially fixed positions) within the touch panel 14T for a predetermined period of time or longer. That is, if a state that a finger is touching the touch panel 14T continues for a predetermined period of time so that the position being touched hardly changes (in other words, so that the amount of change in the touch position is kept within a predetermined amount), it is determined that a long press operation is performed.

In the information processing device 10, in particular, at least one of the conditions A to C mentioned below can be set with respect to each type of operation in the authentication data.

(A) the number of fingers with which a user should touch the touch panel 14T;

(B) the direction in which the user should move the one or more fingers touching the touch panel 14T; and (C) the period of time during which the user should keep touching the touch panel 14T with the one or more fingers.

Figure 3:
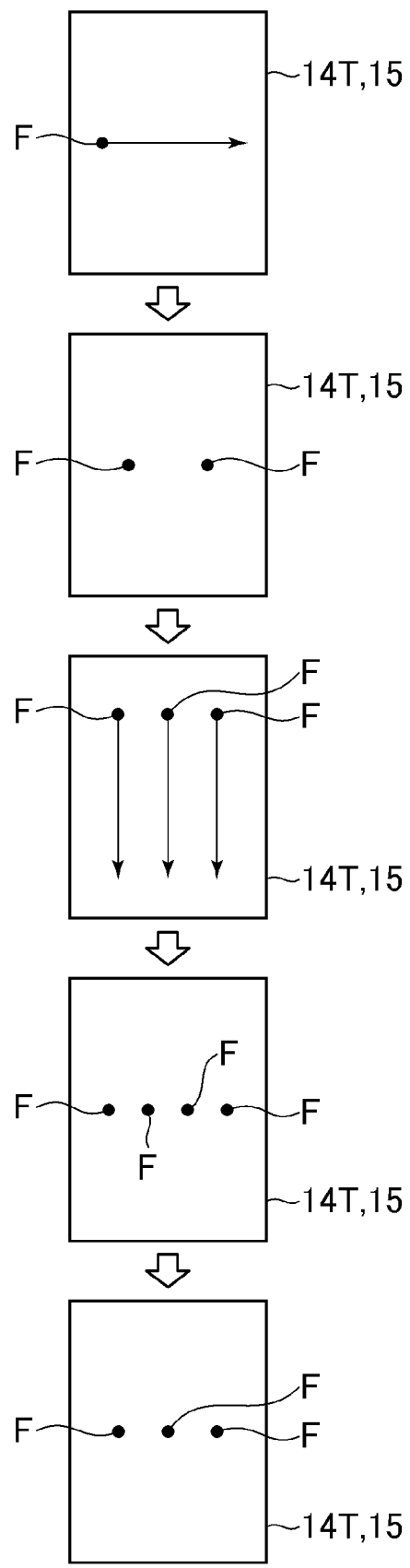
FIG. 3 is diagram explaining one example of setting content of authentication data.

FIG. 3 explains one example of setting content of the authentication data. Note that the reference character "F" refers to the position of a finger of a user. In FIG. 3, a combination of types of operation and a condition (at least one of the following: the number of fingers, the movement direction, and the period of touch time) for performing an operation corresponding to each type of operation, as described below, are set as the authentication data.

That is, as the first type of operation, a "swipe operation" is set. Further, the number of fingers with which to touch the touch panel 14T in performing a swipe operation is set to one; the direction in which the finger should be moved in performing the swipe operation is set to the "shorter side direction" (the Xs axial direction).

As the second type of operation, a "tapping operation" is set. Further, the number of fingers with which to touch the touch panel 14T in performing a tapping operation is set to two.

As the third type of operation, a "swipe operation" is set. Further, the number of fingers with which to touch the touch panel 14l in performing a swipe operation is set to three; the direction in which the finger should be moved in performing the swipe operation is set to the "longitudinal direction" (the Ys axial direction).

As the fourth type of operation, a "tapping operation" is set. Further, the number of fingers with which to touch the touch panel 14T in performing a tapping operation is set to four.

As the fifth type of operation, a "long press operation" is set. Further, the number of fingers with which to touch the touch panel 14T in performing a long press operation is set to three. In this case, a period of time during which the fingers should be kept touching the touch panel 14T in performing the long press operation is set, though not shown in FIG. 3.

In the information processing device 10, when a user sequentially performs the above described operations on an authentication screen, authentication is completed successfully.

As the above described operations can be performed without seeing the screen, a user can perform an authentication operation without seeing the screen, using the information processing device 10 according to this embodiment. Note that when it is necessary to see a screen in performing an authentication operation, like in a conventional information processing device, there is a risk that the screen (content of authentication operation) could be furtively seen by others. Regarding this point, as the operation such as is shown in FIG. 3 can be performed even while the information processing device 10 is in a pocket, there is no risk that the screen (content of authentication operation) could be furtively seen by others.

In addition, in the information processing device 10 according to this embodiment, because the pattern of operations which a user should perform varies, depending on the type of operation (a tapping operation, a swipe operation, and a long press operation), the number of fingers with which to touch the touch panel 14T, the direction in which to move the finger on the touch panel 14T, the period of time during which to keep touching the touch panel 14T, or the like, a number of variations on operation pattern becomes larger. This makes it possible to ensure authentication strength equivalent to at least that of a conventional authentication method.

In addition, in the information processing device 10 according to this embodiment, because it is possible to ensure a variation on one type of operation (the number of fingers, a movement direction, a period of touch time), it is possible to ensure required authentication strength even when a combination of a relatively small number of types of operation is registered as the authentication data.

In the following, a structure for implementing the above described authentication function will be described.

Figures 4, 5:
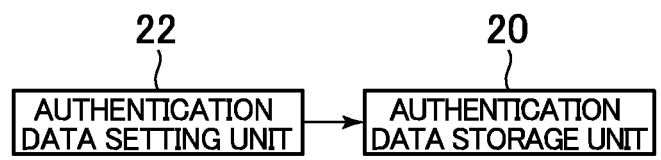
FIG. 4 is a function block diagram of an information processing device.
FIG. 5 shows one example of authentication data.

Initially, function blocks relevant to setting of the authentication data will be described. FIG. 4 is a function block diagram showing function blocks relevant to setting of the authentication data among those implemented in the information processing device 10 according to this embodiment. As shown in FIG. 4, the information processing device 10 includes an authentication data storage unit 20 and an authentication data setting unit 22.

For example, the authentication data storage unit 20 is implemented using the storage unit 12. Alternatively, the authentication data storage unit 20 may be implemented using a storage unit of a device accessible from the information processing device 10 instead. Meanwhile, the authentication data setting unit 22 is implemented using the control unit 11. That is, the control unit 11 executes processing according to a program to thereby function as the authentication data setting unit 22.

The authentication data storage unit 20 will be described. Authentication data is stored in the authentication data storage unit 20. This authentication data is data for authenticating a user himself/herself. As described above, in the information processing device 10, a combination of types of operation and conditions (at least one of the following: the number of fingers, the movement direction, and the period of touch time) for performing an operation corresponding to each of the types of operation are used in authentication of a user himself/herself, instead of a typical password. Note that authentication data is set in advance by a user himself/herself, as in case of a typical password.

FIG. 5 shows one example of the authentication data. The authentication data shown in FIG. 5 corresponds to the example shown in FIG. 3. As shown in FIG. 5, the authentication data indicates a plurality of types of operation which a user should sequentially perform via the touch panel 14T. That is, in the authentication data shown in FIG. 5, five types of operation (a swipe operation, a tapping operation, a swipe operation, a tapping operation, and a long press operation) are set as a plurality of types of operation which a user should perform, and an order in which these five types of operation should be performed is set. In this embodiment, three types of operations, namely, a swipe operation, a tapping operation, and a long press operation, can be set as types of operation which a user should perform.

Further, in the authentication data, at least one of the conditions A to C below is set as to each of the above mentioned five types of operation.

(A) the number of fingers with which a user should touch the touch panel 14T in performing an operation corresponding to a type of operation;

(B) the direction in which the user should move the one or more fingers touching the touch panel 14T in performing the operation corresponding to the type of operation; and (C) the period of time during which the user should keep touching the touch panel 14T with the one or more fingers in performing the operation corresponding to the type of operation.

In the authentication data shown in FIG. 5, the above mentioned condition A (the number of fingers) is set as to each of a swipe operation, a tapping operation, and a long press operation. That is, the above mentioned condition A (the number of fingers) is an indispensable condition. In addition, as to a swipe operation, the above mentioned condition B (a movement direction) is set; as to a long press operation, the above mentioned condition C (a period of touch time) is set. In the authentication data shown in FIG. 5, as the movement direction of a swipe operation, two kinds, namely, the "longitudinal direction" and the "shorter side direction", are set, but three or more kinds may be set as the kinds of movement direction. For example, a "diagonal direction" may be additionally included.

FIGS. 6 and 7 show other examples of the authentication data. In the authentication data shown in FIG. 6, a tapping operation is set as the first to fifth types of operation. Meanwhile, in the authentication data shown in FIG. 7, a swipe operation is set as the first to fourth types of operation.

As described above, only one type of operation may be set as a type of operation which a user should perform. Note that a long press operation alone may be set as a type of operation which a user should perform. Further, two types of operations may be set as types of operation which a user should perform. For example, a swipe operation and a tapping operation may be set as types of operation which a user should perform, a swipe operation and a long press operation may be set as types of operation which a user should perform, and a tapping operation and a long press operation may be set as types of operation which a user should perform.

The authentication data setting unit 22 will be described. The authentication data setting unit 22 is a function block for making it possible for a user to set the above described authentication data. The authentication data setting unit 22 sets authentication data, based on a setting operation by a user.

For example, the authentication data setting unit 22 encourages a user to perform an operation via the touch panel 14T to thereby set the authentication data. Specifically, the authentication data setting unit 22 displays a setting screen 30 such as is shown in FIG. 8, for example, on the display unit 15.

Figure 8:
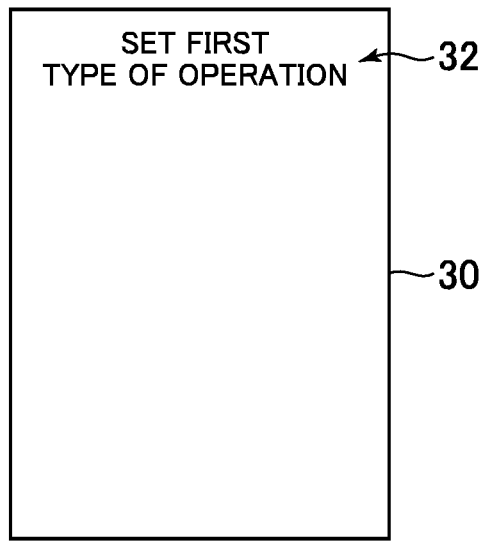
FIG. 8 shows one example of a setting screen.

The setting screen 30 shown in FIG. 8 is a screen for setting the first type of operation (that is, a type of operation to be firstly performed), and displays a message 32 for encouraging a user to set the first type of operation. In this case, the user actually performs an operation via the touch panel 14T to thereby designate the first type of operation and a condition (at least one of the following: the number of fingers, the movement direction, and the period of touch time) for performing an operation corresponding to the first type of operation. That is, the user touches the touch panel 14T with an arbitrary number of fingers and performs any of a swipe operation, a tapping operation, and a long press operation. For a swipe operation, the user performs a swipe operation in an arbitrary direction. For a long press operation, the user performs a long press operation for an arbitrary period of time.

When the user completes any of a swipe operation, a tapping operation, and a long press operation, the type of operation performed by the user is registered as the first type of operation. In addition, a condition (at least one of the following: the number of fingers, the movement direction, and the period of touch time) for performing an operation corresponding to the first type of operation is registered.

For example, when the user performs a tapping operation, using two fingers, a "tapping operation" is registered as the first type of operation, and two is registered as the number of fingers with which a user should touch the touch panel 14T in performing an operation corresponding to the first type of operation.

Further, for example, when the user performs a swipe operation in the longitudinal direction, using three fingers, a "swipe operation" is registered as the first type of operation, and three is registered as the number of fingers with which a user should touch the touch panel 14T in performing an operation corresponding to the first type of operation. Moreover, the longitudinal direction" is registered as a direction in which a user should move the fingers touching the touch panel 14T in performing an operation corresponding to the first type of operation.

Further, for example, when the user performs a long press operation for one second, using four fingers, a "long press operation" is registered as the first type of operation, and four is registered as the number of fingers with which a user should touch the touch panel 14T in performing an operation corresponding to the first type of operation. Moreover, one second" is registered as a period of time during which a user should keep touching the touch panel 14T with the fingers in performing an operation corresponding to the first type of operation.

Once the first type of operation is registered, the setting screen 30 for setting the second type of operation is subsequently displayed. Then, the user sets the second and subsequent types of operation in the manner similar to that for when the first type of operation was set.

Figure 9:
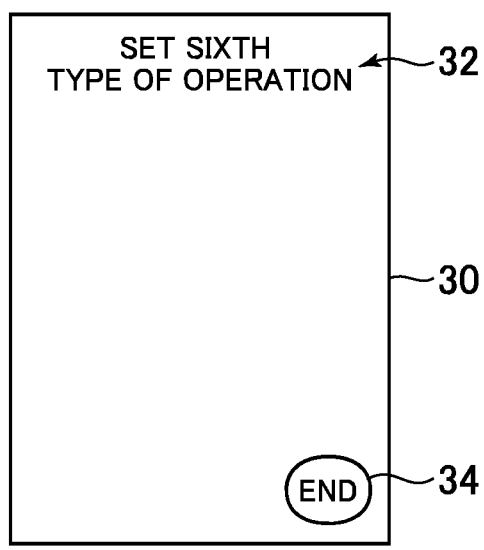
FIG. 9 shows one example of a setting screen.

The setting screen 30 shown in FIG. 9 is a screen for setting the sixth type of operation, and displays a message 32 for encouraging a user to set the sixth type of operation. Moreover, nn the setting screen 30 shown in FIG. 9, an end button 34 is also displayed. When the sixth and subsequent types of operation are not wished to be set, a user selects the end button 34. When the end button 34 is selected, setting of the authentication data is completed.

Note that in the information processing device 10, the lower limit of the number of types of operation which a user should set is determined. For example, when 4 is determined as the lower limit, the end button 34 is displayed on the setting screen 30 after the completion of setting of the fourth type of operation.

Figure 10:
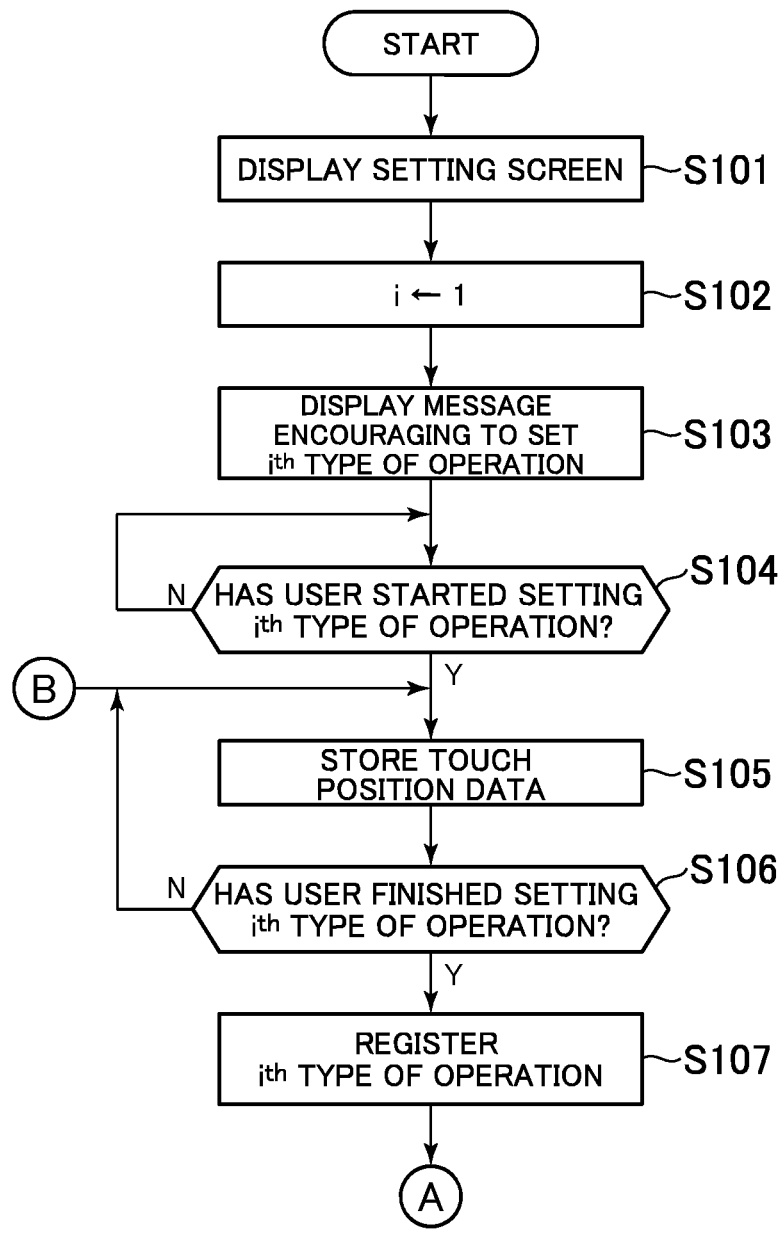
FIG. 10 is a flowchart showing one example of processing executed in an information processing device.
Figure 11:
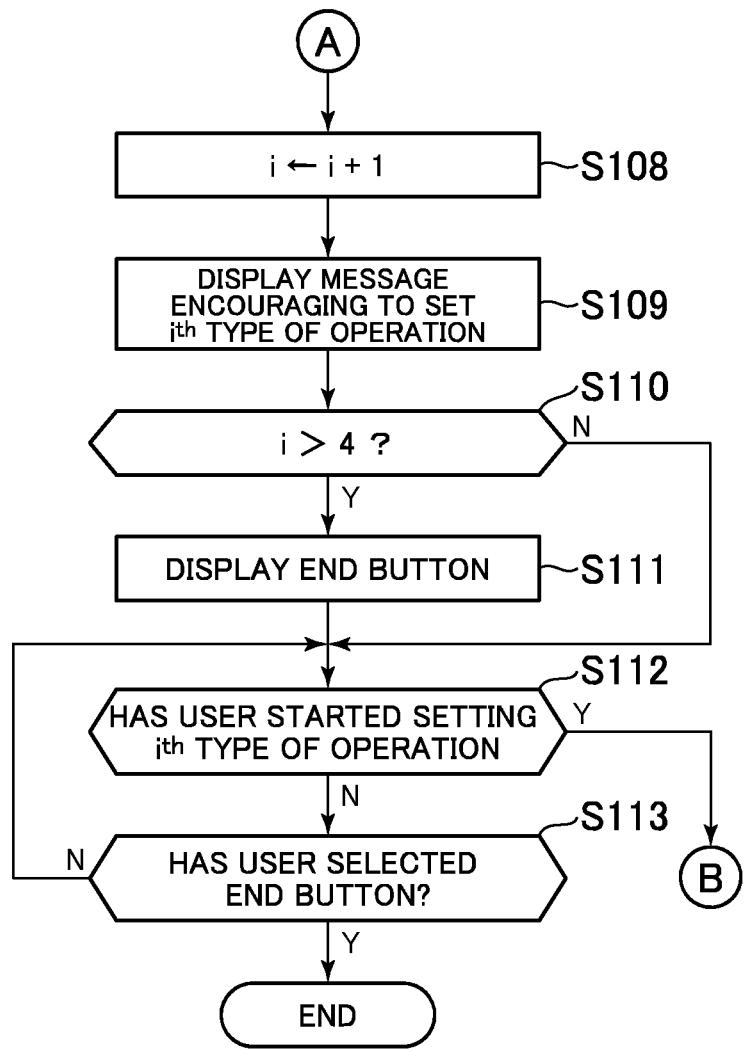
FIG. 11 is a flowchart showing one example of processing executed in an information processing device.

Below, processing that is executed in the information processing device 10 to implement the authentication data setting unit 22 will be described. FIGS. 10 and 11 are flowcharts showing one example of processing relevant to setting of the authentication data. The control unit 11 executes the processing shown in FIGS. 10 and 11 according to a program to thereby function as the authentication data setting unit 22.

As shown in FIG. 10, the control unit 11 displays a setting screen 30 on the display unit 15 (S101). Moreover, the control unit 11 initializes the variable i to "1" (S102). Thereafter, the control unit 11 displays a message 32 encouraging to set the $i^{th}$ type of operation on the setting screen 30 (S103).

Thereafter, the control unit 11 determines whether or not a user has started setting the $i^{th}$ type of operation (S104). For example, the control unit 11 determines whether or not the user has started touching the touch panel 14T. In other words, the control unit 11 determines whether or not a state where no finger is touching the touch panel 14T has shifted to a state where at least one finger is touching the touch panel 14T. In the case where the user has started touching the touch panel 14T, the control unit 11 determines that the user has started setting the $i^{th}$ type of operation.

In the case where the user has started setting the $i^{th}$ type of operation, the control unit 11 stores touch position data (S105). Then, the control unit 11 determines whether or not the user has finished setting the $i^{th}$ type of operation (S106).

In the case where the user has finished setting the $i^{th}$ type of operation, the control unit 11 registers the $i^{th}$ type of operation and a condition (at least one of the following: the number of fingers, the movement direction, and the period of touch time) for performing an operation corresponding to the $i^{th}$ type of operation in the authentication data, based on the data stored at step S105 (S107).

For example, the control unit 11 (first obtaining means) obtains the type of operation (a tapping operation, a swipe operation, or a long press operation) which the user has performed via the touch panel 14T, based on the detection result of the touch panel 14T.

Further, in the case where the type of operation performed by the user is a tapping operation, for example, the control unit 11 (second obtaining means) obtains the number of fingers with which the user has touched the touch panel 14T in performing the tapping operation, based on the detection result of the touch panel 14T.

Further, in the case where the type of operation performed by the user is a swipe operation, for example, the control unit 11 (the second obtaining means) obtains the number of fingers with which the user has touched the touch panel 14T in performing the swipe operation and the direction in which the user has moved the one or more fingers touching the touch panel 14T in performing the swipe operation, based on the detection result of the touch panel 14T.

Further, in the case where the type of operation performed by the user is a long press operation, for example, the control unit 11 (the second obtaining means) obtains the number of fingers with which the user has touched the touch panel 14T in performing the long press operation, and the period of time during which the user has kept touching the touch panel 14T with the one or more fingers in performing the long press operation, based on the detection result of the touch panel 14T.

Then, based on the obtained results described above, the control unit 11 registers the $i^{th}$ type of operation and the condition (at least one of the following: the number of fingers, the movement direction, and the period of touch time) for performing an operation corresponding to the $i^{th}$ type of operation in the authentication data.

Thereafter, as shown in FIG. 11, the control unit 11 adds 1 to the variable i (S108), and displays a message 32 encouraging to set the $i^{th}$ type of operation on the setting screen 30 (S109).

Further, the control unit 11 determines whether or not the value of the variable i is greater than 4 (S110). Note that a case is assumed here in which 4 is the lower limit of the number of types of operation which a user should set, and hence it is determined whether or not the value of the variable i is greater than 4 at step S110. In the case where the value of the variable i is greater than "4", the control unit 11 displays the end button 34 on the setting screen 30 (S111).

Thereafter, the control unit 11 determines whether or not the user has started setting the $i^{th}$ type of operation (S112). This step S112 is similar to step S104.

In the case where the user has started setting the $i^{th}$ type of operation, the control unit 11 executes step S105 again. Meanwhile, in the case where the user has not yet started setting the $i^{th}$ type of operation, the control unit 11 determines whether or not the user has selected the end button 34 (S113).

In the case where the user has not selected the end button 34, the control unit 11 executes step S112 again. Meanwhile, in the case where the user has selected the end button 34, the control unit 11 shows the content of the authentication data set by the user to the user, and then ends this processing.

Figure 12:
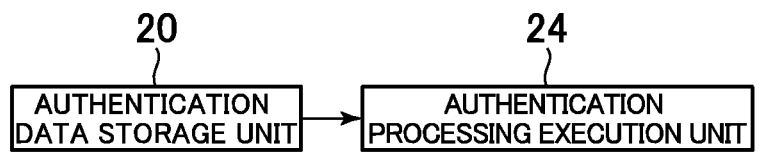
FIG. 12 is a function block diagram of an information processing device.

In the following, a function block relevant to execution of authentication processing will be described. FIG. 12 is a function block diagram showing function blocks relevant to execution of authentication processing among those implemented in the information processing device 10 according to this embodiment. As shown in FIG. 12, the information processing device 10 includes the authentication data storage unit 20 and an authentication processing execution unit 24. Note that the data storage unit 20 is not described here as it has already been described above.

The authentication processing execution unit 24 is implemented using the control unit 11. That is, the control unit 11 executes processing according to the program to thereby function as the authentication processing execution unit 24.

The authentication processing execution unit 24 executes authentication processing by determining, based on the detection result of the touch panel 14T, whether or not operations corresponding to each of a plurality of types of operation set in the authentication data have been performed in a predetermined order by touching the touch panel 14T with the number of fingers set for each of the plurality of types of operation.

As to a type of operation (for example, a swipe operation) with respect to which a direction in which a user should move the finger touching the touch panel 14T is set, the authentication processing execution unit 24 executes authentication processing by determining whether or not an operation corresponding to the type of operation has been performed by touching the touch panel 14T with the number of fingers set for the type of operation and moving the fingers in a direction corresponding to the direction set for the type of operation.

Note here that a "direction corresponding to the direction set for a type of operation" refers to the direction itself set for the type of operation, for example. Alternatively, a "direction corresponding to the direction set for a type of operation" refers to a direction, discrepancy (angle) between which and the direction set for the type of operation is equal to or smaller than a threshold.

As to an operation corresponding to a type of operation (for example, a long press operation) with respect to which a period of time during which a user should keep touching the touch panel 14T with a finger is set, the authentication processing execution unit 24 executes the authentication processing by determining whether or not an operation corresponding to the type of operation has been performed by touching the touch panel 14T with the number of fingers set for the type of operation and keeping touching the touch panel 14T with the finger for a period of time corresponding to the period of time set for the type of operation.

Note here that a "period of time corresponding to the period of time set for a type of operation" refers to the period of time itself set for the type of operation, for example. Alternatively, a "period of time corresponding to the period of time set for a type of operation" refers to a period of time, a discrepancy between which and the period of time set for the type of operation is equal to or smaller than a threshold.

Figure 13:
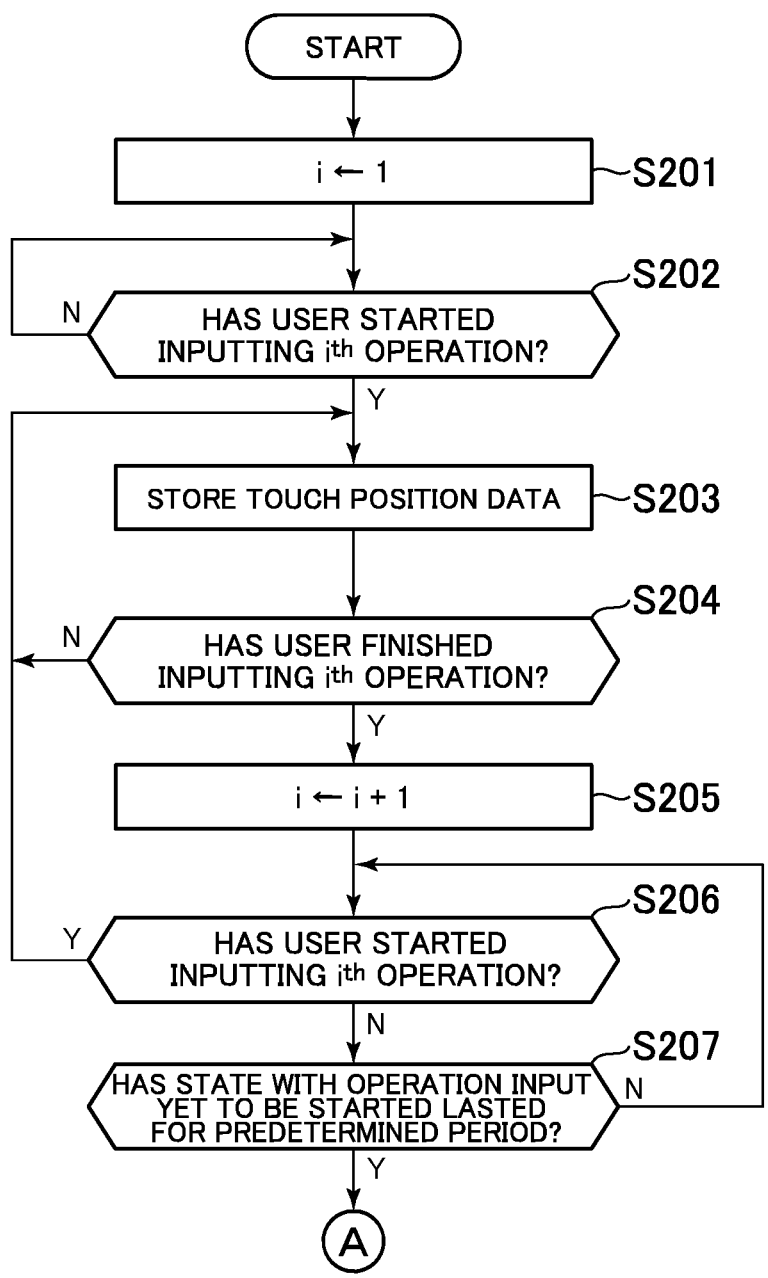
FIG. 13 is a flowchart showing one example of another processing executed in an information processing device.
Figure 14:
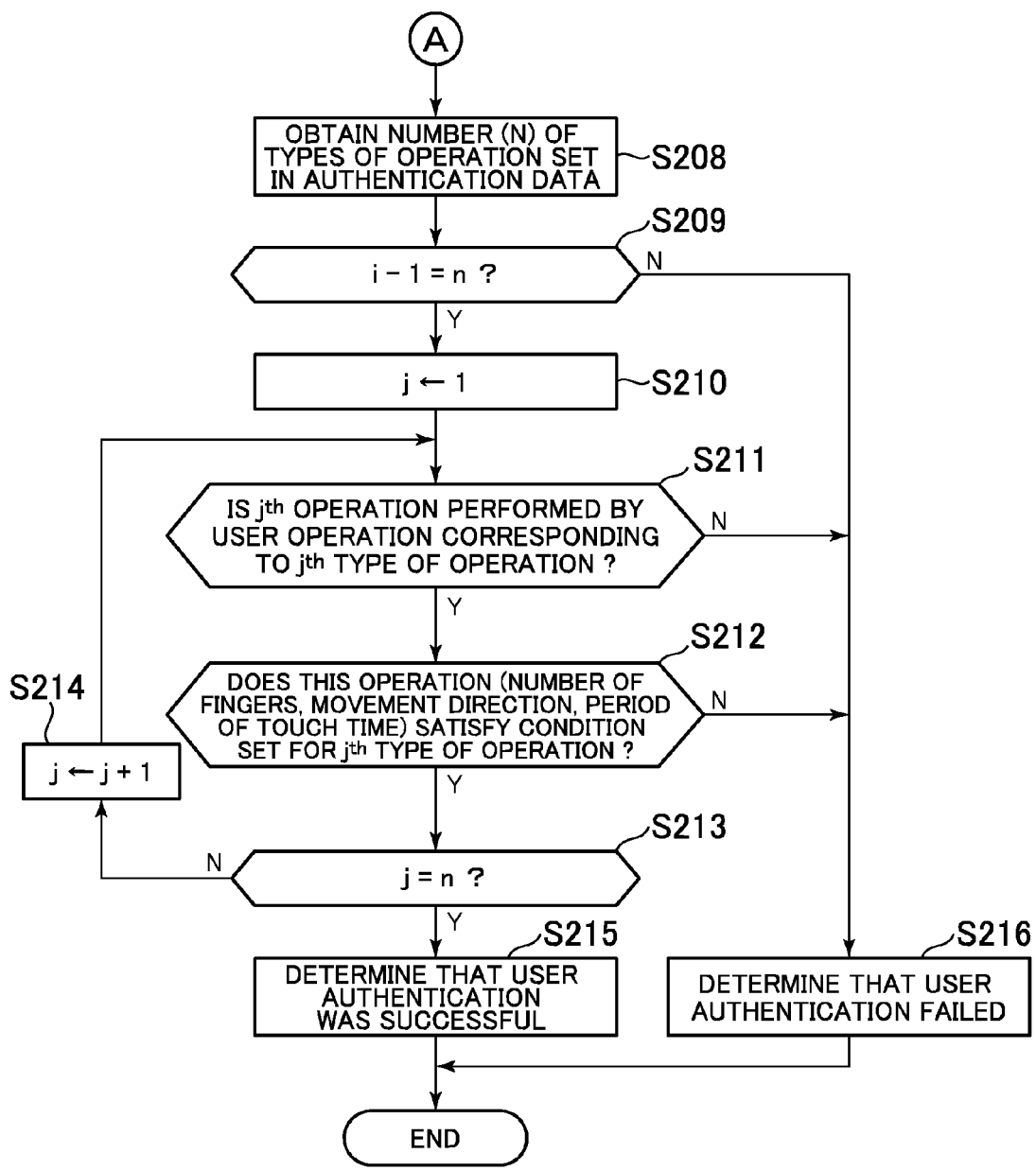
FIG. 14 is a flowchart showing one example of another processing executed in an information processing device.

In the following, processing that is executed in the information processing device 10 to implement the above described function block will be described. FIGS. 13 and 14 are flowcharts showing one example of processing that is executed in the information processing device 10. The control unit 11 executes the processing shown in FIGS. 13 and 14 according to a program to thereby function as the authentication processing execution unit 24.

As shown in FIG. 13, the control unit 11 initialize the variable i to "1" (S201). Thereafter, the control unit 11 determines whether or not a user has started inputting the $i^{th}$ operation (S202)

Specifically, the control unit 11 determines whether or not the user has started touching the touch panel 14T. In other words, the control unit 11 determines whether or not a state where no finger is touching the touch panel 14T has shifted to a state where at least one finger is touching the touch panel 14T. In the case where the user has started touching the touch panel 14T, the control unit 11 determines that the user has started inputting the $i^{th}$ operation.

In the case when it is determined that the user has started inputting the $i^{th}$ operation, the control unit 11 stores touch position data (S203). Then, whether or not the user has finished inputting the $i^{th}$ operation is determined (S204).

Specifically, the control unit 11 determines whether or not the user has ended touching the touch panel 14T. In other words, the control unit 11 determines whether or not a state where at least one finger is touching the touch panel 14T has shifted to a state where no finger is touching the touch panel 14T. In the case where a user has ended touching the touch panel 14T, the control unit 11 determines that the user has finished inputting the $i^{th}$ operation.

In the case where it is determined that the user has finished inputting the $i^{th}$ operation, touch position data from the moment at which the user has started inputting the $i^{th}$ operation to the moment at which the user has finished inputting the $i^{th}$ operation is stored as the $i^{th}$ operation data in the storage unit 12.

Thereafter, the control unit 11 adds 1 to the variable i (S205), and then determines whether or not the user has started inputting the $i^{th}$ operation (S206). Step S206 is similar to step S202.

In the case where the user has started inputting the $i^{th}$ operation, the control unit 11 executes step S203 again. Meanwhile, in the case where the user has not yet started inputting the $i^{th}$ operation, the control unit 11 determines whether or not a state where an input of an operation is not yet started has continued for a predetermined period of time (S207).

When the above described state has continued for a predetermined period of time, the control unit 11 determines that the user has completed inputting. Note that although it is determined in the above that the user has completed inputting when the above described state has continued for the predetermined period of time, other methods may be employed. For example, a specific operation (for example, a long press operation with one finger) may be adopted as an end instruction operation, and it may be determined that a user has completed inputting when the specific operation is performed by a user.

When it is determined that the user has completed inputting, the control unit 11 starts execution of processing for comparing the content of operation performed by the user and the content of operation set in the authentication data.

That is, as shown in FIG. 14, referring to the authentication data, the control unit 11 obtains the number (n) of types of operation set in the authentication data (S208). For example, in the case of the authentication data shown in FIG. 5, because five types of operation are set in the authentication data, the control unit 11 obtains 5 as the above mentioned number (n).

Thereafter, the control unit 11 determines whether or not the number (i-1) of operations performed by the user is equal to the number (n) of types of operation set in the authentication data (S209). In the case where these numbers are not equal to each other, the control unit 11 determines that the user authentication failed (S216), and notifies the user of the failure. For example, the control unit 11 displays a message indicating that the user authentication failed on the display unit 15. Alternatively, the control unit 11 may output a sound indicating that the user authentication failed from the sound output unit 16. Still alternatively, in the case where an information processing device 10 has a vibration function, the control unit 11 may cause the information processing device 10 to vibrate in a manner indicating that the user authentication failed.

Meanwhile, in the case where these numbers are equal to each other, the control unit 11 initializes the variable j to "1" (S210). Then, the control unit 11 determines whether or not the operation performed by the user in the $j^{th}$ order (the operation performed by the user after (j-1) operations) has been performed is an operation corresponding to the $j^{th}$ type of operation set in the authentication data (S211). For example, in the case where the $j^{th}$ type of operation set in the authentication data is a tapping operation, the control unit 11 determines whether or not the operation performed by the user in the $j^{th}$ order (the operation performed by the user after (j-1) operations has been performed) is a tapping operation. This determination is made based on the authentication data and the $j^{th}$ operation data stored in the storage unit 12.

In the case where the operation performed by the user in the $j^{th}$ order (the operation performed by the user after (j-1) operations) has been performed is an operation corresponding to the $j^{th}$ type of operation set in the authentication data, the control unit 11 determines whether or not the operation satisfies the condition set for the $j^{th}$ type of operation (S212).

For example, in the case where the $j^{th}$ type of operation set in the authentication data is a tapping operation, the number of fingers with which the user should touch the touch panel 14T is determined as the above mentioned condition (see FIG. 5). Thus, in the case where the operation performed by the user in the $j^{th}$ order (the operation performed by the user after (j-1) operations) has been performed is a tapping operation, the control unit 11 (the second obtaining means) obtains the number of fingers with which the user has touched the touch panel 14T in performing the tapping operation, based on the operation data.

Then, the control unit 11 determines whether or not the obtained number of fingers coincides with the number of fingers set in the authentication data. In this case, if the obtained number of fingers coincides with the number of fingers set in the authentication data, the control unit 11 determines that the condition set for the $j^{th}$ type of operation is satisfied.

Further, in the case where, for example, the $j^{th}$ type of operation set in the authentication data is a swipe operation, the number of fingers with which a user should touch the touch panel 14T and the direction in which the user should move the finger touching the touch panel 14T are determined as the above mentioned condition (see FIG. 5). Thus, in the case where the operation performed by the user in the $j^{th}$ order (the operation performed by the user after (j-1) operations) has been performed is a swipe operation, the control unit 11 (the second obtaining means) obtains the number of fingers with which the user has touched the touch panel 14T in performing the swipe operation and the direction in which the user has moved the one or more fingers touching the touch panel 14T in performing the swipe operation, based on the operation data.

Then, the control unit 11 determines whether or not the obtained number of fingers coincides with the number of fingers set in the authentication data. Further, the control unit 11 determines whether or not the difference (an angle) between the obtained movement direction and the movement direction set in the authentication data is equal to or less than a threshold. In this case, if the obtained number of fingers coincides with the number of fingers set in the authentication data and the above difference is equal to or less than the threshold, the control unit 11 determines that the condition set for the $j^{th}$ type of operation is satisfied.

Further, in the case where, for example, the $j^{th}$ type of operation set in the authentication data is a long press operation, the number of fingers with which a user should touch the touch panel 14T and the period of time during which the user should keep touching the touch panel 14T with fingers are determined as the above mentioned condition (see FIG. 5). Thus, in the case where the operation performed by the user in the $j^{th}$ order (the operation performed by the user after (j-1) operations) has been performed is a long press operation, the control unit 11 (the second obtaining means) obtains the number of fingers with which the user has touched the touch panel 14T in performing the long press operation and the period of time during which the user kept touching the touch panel 14T with the one or more fingers in performing the long press operation, based on the operation data.

Then, the control unit 11 determines whether or not the obtained number of fingers coincides with the number of fingers set in the authentication data. Further, the control unit 11 determines whether or not the difference between the obtained period of touch time and the period of touch time set in the authentication data is equal to or less than a threshold. In this case, if the obtained number of fingers coincides with the number of fingers set in the authentication data and the above difference is equal to or less than the threshold, the control unit 11 determines that the condition set for the $j^{th}$ type of operation is satisfied.

When it is determined at step S211 that the operation performed by the user in the $j^{th}$ order (the operation performed by the user after (j-1) operations) has been performed is not an operation corresponding to the $j^{th}$ type of operation set in the authentication data or when it is determined at step S212 that the condition set for the $j^{th}$ type of operation is not satisfied, the control unit 11 determines that the user authentication failed (S216), and notifies the user of the failure.

Meanwhile, when it is determined at step S212 that the condition set for the $j^{th}$ type of operation is satisfied, the control unit 11 determines whether or not the value of the variable j is equal to the number (n) of types of operation set in the authentication data (S213). When these values are not equal to each other, the control unit 11 adds 1 to the value of the variable j (S214), and executes step S211 again.

Meanwhile, when the value of the variable j is equal to the number (n) of types of operation set in the authentication data, the control unit 11 determines that a user authentication was successful (S215), and notifies the user of the success. For example, the control unit 11 displays a message indicating that the user authentication was successful on the display unit 15. Alternatively, the control unit 11 may output a sound indicating that the user authentication was successful from the second output unit 16. Still alternatively, in the case where an information processing device 10 has a vibration function, the control unit 11 may cause the information processing device 10 to vibrate in a manner indicating that the user authentication was successful. With the above, the description on the processing shown in FIGS. 13 and 14 is finished.

With the above described information processing device 10, a user can perform an authentication operation without seeing the screen. Further, a user can perform an authentication operation while having the information processing device 10 in a pocket. As a result, it is possible to avoid a risk that the screen (content of authentication operation) could be furtively seen by others.

In addition, in the information processing device 10, authentication data varies depending on a type of operation (a tapping operation, a swipe operation, and a long press operation), the number of fingers with which to touch the touch panel 14T, the direction in which to move fingers on the touch panel 14T, the period of time during which the touch panel 14T is kept touched, and the like, and a number of patterns of authentication data increases. This makes it possible to ensure required authentication strength.

In addition, in the information processing device 10, as it is possible to ensure a variation on one type of operation (the number of fingers, a movement direction, a period of touch time), it is possible to ensure required authentication strength even when a combination of a relatively small number of types of operation is registered as the authentication data.

Note that the present invention is not limited to the above described embodiments.

[1] For example, the "period of touch time" field may be excluded from the authentication data shown in FIGS. 5 to 7. That is, the period of touch time of a long press operation may be fixed to a predetermined period of time, rather than having it designated by a user.

[2] For example, the "movement direction" field may be excluded from the authentication data shown in FIGS. 5 to 7. It may be configured by doing so that it becomes unnecessary to take the movement direction of a swipe operation into consideration. That is, it may be configured that a user may perform a swipe operation in an arbitrary direction.

[3] Although, for example the movement direction of a swipe operation is absolutely designated in the authentication data shown in FIGS. 5 to 7, the movement direction of a swipe operation may be designated relatively with respect to the direction in which the fingers are aligned.

Figure 16:
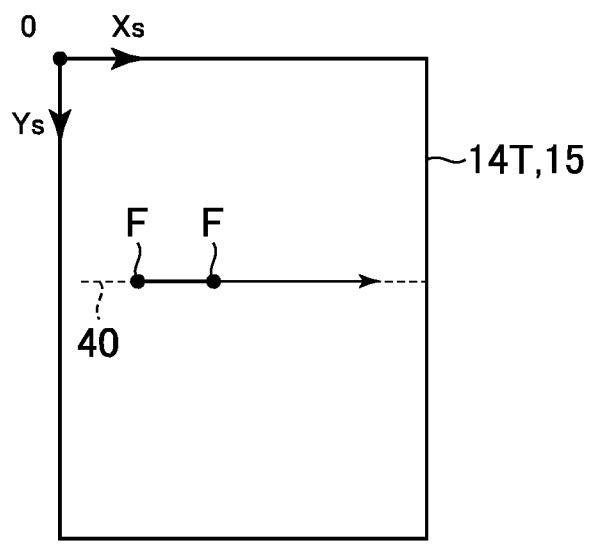
FIG. 16 shows one example of a swipe operation which a user should perform.

FIG. 15 shows one example of the authentication data in this case. In the authentication data shown in FIG. 15, the first type of operation is a swipe operation, and a condition concerning the number of fingers and a condition concerning the movement direction are set to 2 and a parallel direction, respectively, as conditions for the swipe operation. This means that a swipe operation should be performed in the manner in which the touch panel 14T is touched with two fingers and the two fingers are slid in a direction parallel to the direction in which the two fingers are aligned. FIG. 16 shows one example of this swipe operation. In FIG. 16, the direction 40 in which the two fingers are aligned is parallel to the Xs axial direction. Thus, in this case, it is necessary to slide the two fingers in the Xs axial direction.

Figure 17:
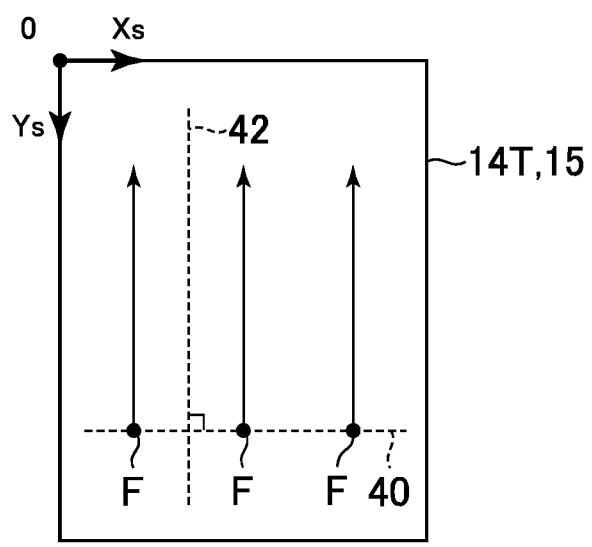
FIG. 17 shows another example of a swipe operation which a user should perform.

Further, in the authentication data shown in FIG. 15, the third type of operation is a swipe operation, and a condition concerning the number of fingers and a condition concerning the movement direction are set to 3 and an orthogonal direction, respectively, as conditions for the swipe operation. This means that a swipe operation should be performed in the manner in which the touch panel 14T is touched with three fingers and the three fingers are slid in a direction orthogonal to the direction in which the three fingers are aligned. FIG. 17 shows one example of this swipe operation. In FIG. 17, the direction 40 in which the three fingers are aligned is parallel to the Xs axial direction. Further, the direction 42 orthogonal to the direction 40 in which the three fingers are aligned is parallel to the Ys axial direction. Thus, in this case, it is necessary to touch the touch panel 14T with three fingers and to slide the three fingers in the Ys axial direction.

In the above described manner, a user can determine the direction in which the user should move the finger (the movement direction of the swipe operation), based on the direction in which the fingers are aligned. This makes it much easier for a user to perform the authentication operation without seeing the screen (for example, authentication operation while having the information processing device 10 in a pocket).

Figures 18, 19:
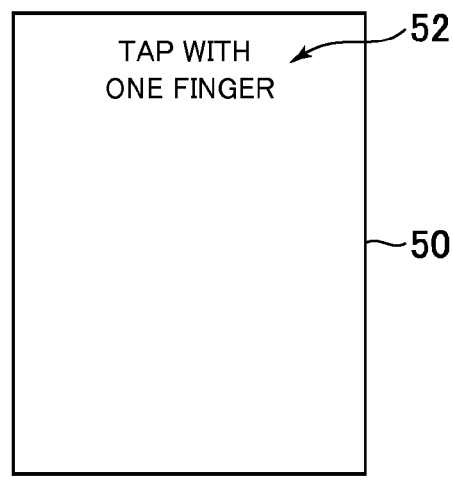
FIG. 18 shows another example of authentication data.
FIG. 19 shows one example of a test screen.

[4] For example, authentication data such as is shown in FIG. 18 may be stored instead of the authentication data shown in FIG. 5.

The authentication data shown in FIG. 18 is different from the authentication data shown in FIG. 5 in that an operation interval (a reference operation interval) is set. In FIG. 18, an operation interval (the reference operation interval) associated with the $i^{th}$ type of operation s means an operation interval between the $(i-1)^{th}$ type of operation and the $i^{th}$ type of operation.

In this case, processing to be described below is executed in the processing shown in FIGS. 13 and 14. For example, when it is determined at step S206 that an input of the $i^{th}$ operation has been started, the control unit 11 obtains the period of time (an operation interval) elapsed after the end of the input of the $(i-1)^{th}$ operation and before the start of an input of the $i^{th}$ operation. Then, the operation interval obtained as described above is stored as a part of the $i^{th}$ operation data in the storage unit 12.

In addition, for example, at step S212 in FIG. 14, the control unit 11 determines whether or not the difference between an operation interval of a user (that is, the period of time elapsed after the end of the input of the $(i-1)^{th}$ operation by a user and before the start of the input of the $i^{th}$ operation) and the reference operation interval set in the authentication data (that is, the reference operation interval between the $(j-1)^{th}$ type of operation and the $j^{th}$ type of operation) is less than a threshold. If the above difference is not less than the threshold, the control unit 11 determines that the user authentication failed (S216).

In the above described manner, it is possible to increase variation on the authentication data, and resultantly to increase the authentication strength. Note that because the operation interval can be adjusted without seeing the screen, the advantage that a user can perform the authentication operation without seeing the screen can be maintained even in the above described arrangement.

[5] Note here that although the number of fingers touching the touch panel 14T can be accurately detected as to a swipe operation, the number of fingers touching the touch panel 14T may not be able to be accurately detected as to a tapping operation. For example, it may be possibly determined that a tapping operation was performed using two fingers even when a tapping operation was performed using three fingers. This may resultantly deteriorate authentication accuracy. It is considered that this is due to individual difference of each information processing device 10 (the touch panel 14T), a user s habit, or the like. Then, in order to prevent deterioration in authentication accuracy, the authentication data setting unit 22 may have a structure described below.

For example, the authentication data setting unit 22 displays a test screen on the display unit 15 for testing whether or not a detection of a tapping operation is prone to fail, before displaying the setting screen 30.

FIG. 19 shows one example of the test screen. As shown in FIG. 19, a message 52 for encouraging a user to perform a tapping operation using a predetermined number of fingers is displayed on the test screen 50. In the example shown in FIG. 19, a message 52 for encouraging to perform a tapping operating with one finger is displayed. In this case, a user performs a tapping operation, using one finger.

The authentication data setting unit 22 compares the number of touch positions detected by the touch panel 14T and the number of fingers a user has been encouraged to use. The authentication data setting unit 22 executes similar comparison processing with respect to tapping operations using two to five fingers. Further, the authentication data setting unit 22 repetitively executes such comparison processing, and determines whether or not a detection of a tapping operation is prone to fail, based on the result. For example, the authentication data setting unit 22 calculates a failure frequency or a failure rate of a detection of a tapping operation, and determines that a detection of a tapping operation is prone to fail when the failure frequency or a failure rate is greater than a threshold.

For example, when it is determined that detection of a tapping operation is prone to fail, the authentication data setting unit 22 encourages a user to register a swipe operation with priority over a tapping operation in the authentication data. For example, the authentication data setting unit 22 displays a message on the display unit 15 to the effect that it is preferable to register a swipe operation with priority over a tapping operation in the authentication data.

In addition, for example, when it is determined that a detection of a tapping operation is prone to fail, the authentication data setting unit 22 may restrict registration of a tapping operation by a user in the authentication data.

That is, the authentication data setting unit 22 may prohibit a user from registering a tapping operation in the authentication data.

Alternatively, the authentication data setting unit 22 may prohibit a user from registering a tapping operation with the number of fingers greater than the upper limit number (for example, three fingers) in the authentication data. In this case, the authentication data setting unit 22 may set the upper limit number, based on the failure frequency or the failure rate of a detection of a tapping operation. For example, it may be arranged, based on information that associates a failure frequency or a failure rate of a detection of a tapping operation and the upper limit number, such that the higher a failure frequency or a failure rate of detection of a tapping operation becomes, the smaller the upper limit number gets.

In the above described manner, it is possible to prevent deterioration in authentication accuracy.

[6] On the setting screen or the authentication screen, an image which helps a user to know how the information processing device 10 detects the operation performed by the user may be displayed.

The invention claimed is:

1. An information processing device, comprising:
a touch panel;
at least one processor; and
at least one storage device that stores a plurality of instructions, which when executed by the at least one processor, causes the at least one processor to operate to:
obtain a result of detection by the touch panel detecting a plurality of positions touched by a user;
refer to authentication data stored in the at least one storage device, the authentication data indicating a plurality of types of operation which the user perform in a predetermined order via the touch panel, and a number of fingers, as to each one of the plurality of types of operation, with which the user touch the touch panel when performing an operation corresponding to the one of the plurality of types of operation;
execute authentication processing by determining, based on a result of detection by the touch panel and the authentication data, whether or not an operation corresponding to each of the plurality of types of operation has been performed in the predetermined order by touching the touch panel with a number of fingers set for each of the plurality of types of operation, and
unlock the information processing device based on the determination of a successful authentication, wherein the authentication data further indicates, as to at least one of the plurality of types of operation, a direction in which the user moves one or more fingers touching the touch panel when performing an operation corresponding to each of the at least one of the plurality of types of operation, the at least one processor executes the authentication processing, when determining whether or not an operation corresponding to a type of operation for which the direction is set has been performed, by determining whether or not the operation corresponding to the type of operation has been performed by touching the touch panel with a number of fingers set for the type of operation and moving the one or more fingers touching the touch panel in a direction corresponding to the direction set for the type of operation, and the authentication data indicates a direction in which the user moves a plurality of fingers touching the touch panel when performing an operation corresponding to the type of operation with a relative direction with respect to a direction in which the plurality of fingers touching the touch panel are aligned.

2. The information processing device according to claim 1, wherein the authentication data further indicates, as to at least one of the plurality of types of operation, a period of time during which the user should keep touching the touch panel with one or more fingers when performing an operation corresponding to each of the at least one of the plurality of types of operation, and the at least one processor executes the authentication processing, when determining whether or not an operation corresponding to a type of operation for which the period of time is set has been performed, by determining whether or not the operation corresponding to the type of operation has been performed by touching the touch panel with a number of fingers set for the type of operation and keeping touching the touch panel with the one or more fingers for a period of time corresponding to the period of time set for the type of operation.

3. The information processing device according to claim 1, wherein the authentication data further indicates a reference operation interval of when the user performs an operation corresponding to each of the plurality of types of operation, and the at least one processor executes the authentication processing by determining whether or not the operation corresponding to each of the plurality of types of operation have been performed at an operation interval corresponding to the reference operation interval.

4. The information processing device according to claim 1, wherein the plurality of types of operation which the user should perform in the predetermined order via the touch panel include a tapping operation.

5. The information processing device according to claim 1, wherein the plurality of types of operation which the user should perform in the predetermined order via the touch panel include a swipe operation.

6. The information processing device according to claim 1, wherein the plurality of types of operation which the user should perform in the predetermined order via the touch panel include a long press operation.

7. An information processing device, comprising:
a touch panel;
at least one processor, and
at least one storage device that stores a plurality of instructions, which when executed by the at least one processor, causes the at least one processor to operate to:

obtain a result of detection by the touch panel detecting a plurality of positions touched by a user;

refer to authentication data stored in the at least one storage device, the authentication data indicating a plurality of types of operation which the user perform in a predetermined order via the touch panel, and a number of fingers, as to each one of the plurality of types of operation, with which the user touch the touch panel when performing an operation corresponding to the one of the plurality of types of operation;

execute authentication processing by determining, based on a result of detection by the touch panel and the authentication data, whether or not an operation corresponding to each of the plurality of types of operation has been performed in the predetermined order by touching the touch panel with a number of fingers set for each of the plurality of types of operation; and unlock the information processing device based on the determination of a successful authentication, wherein the at least one processor is further caused to:
encourage the user to set the authentication data by performing an operation via the touch panel;

obtain a plurality of types of operation which the user has performed via the touch panel, based on the result of detection by the touch panel;

obtain, as to each one of the plurality of types of operation which the user has performed via the touch panel, a number of fingers with which the user was touching the touch panel when performing an operation corresponding to the one of the plurality of types of operation, based on the result of detection by the touch panel; and set the authentication data, based on obtained content, wherein it is possible to set a tapping operation as a type of operation which the user performs via the touch panel, and wherein the at least one processor is further caused to:
encourage the user to perform the tapping operation, using a predetermined number of fingers;

obtain a number of touch positions detected by the touch panel;

compare the predetermined number and the number of touch positions detected by the touch panel; and execute processing for restraining the tapping operation from being set as the type of operation which the user performs via the touch panel, based on a result of comparison.

8. The information processing device according to claim 7, wherein it is possible to set a tapping operation or a swipe operation as the type of operation which the user should perform via the touch panel, and the at least one processor encourages the user to set the swipe operation with priority over the tapping operation as the type of operation which the user should perform via the touch panel, based on the result of comparison by the comparison.

9. The information processing device according to claim 7, wherein the at least one processor restrains the tapping operation from being set as the type of operation which the user should perform via the touch panel, based on the result of comparison.

10. A method for controlling an information processing device, comprising:
- obtaining a result of detection by a touch panel detecting a plurality of positions touched by a user;
- referring to authentication data stored in a storage, the authentication data indicating a plurality of types of operation which the user perform in a predetermined order via the touch panel, and a number of fingers, as to each one of the plurality of types of operation, with which the user touch the touch panel when performing an operation corresponding to the one of the plurality of types of operation;
- executing authentication processing with at least one processor by determining, based on the result of detection by the touch panel and the authentication data, whether or not an operation corresponding to each of the plurality of types of operation has been performed in the predetermined order by touching the touch panel with a number of fingers set for each of the plurality of types of operation; and
- unlocking the information processing device based on the determination of a successful authentication, wherein
- the authentication data further indicates, as to at least one of the plurality of types of operation, a direction in which the user moves one or more fingers touching the touch panel when performing an operation corresponding to each of the at least one of the plurality of types of operation,
- the executing comprises executing the authentication processing, when determining whether or not an operation corresponding to a type of operation for which the direction is set has been performed, by determining whether or not the operation corresponding to the type of operation has been performed by touching the touch panel with a number of fingers set for the type of operation and moving the one or more fingers touching the touch panel in a direction corresponding to the direction set for the type of operation, and
- the authentication data indicates a direction in which the user moves a plurality of fingers touching the touch panel when performing an operation corresponding to the type of operation with a relative direction with respect to a direction in which the plurality of fingers touching the touch panel are aligned.

11. A method for controlling an information processing device, comprising:
- obtaining a result of detection by a touch panel detecting a plurality of positions touched by a user;
- referring to authentication data stored in a storage, the authentication data indicating a plurality of types of operation which the user perform in a predetermined order via the touch panel, and a number of fingers, as to each one of the plurality of types of operation, with which the user touch the touch panel when performing an operation corresponding to the one of the plurality of types of operation;
- executing authentication processing with at least one processor by determining, based on the result of detection by the touch panel and the authentication data, whether or not an operation corresponding to each of the plurality of types of operation has been performed in the predetermined order by touching the touch panel with a number of fingers set for each of the plurality of types of operation; and
- unlocking the information processing device based on the determination of a successful authentication,
- wherein the method further comprises:
- encouraging the user to set the authentication data by performing an operation via the touch panel;
- obtaining a plurality of types of operation which the user has performed via the touch panel, based on the result of detection by the touch panel;
- obtaining, as to each one of the plurality of types of operation which the user has performed via the touch panel, a number of fingers with which the user was touching the touch panel when performing an operation corresponding to the one of the plurality of types of operation, based on the result of detection by the touch panel; and
- setting the authentication data, based on content obtained at the obtaining, wherein it is possible to set a tapping operation as a type of operation which the user performs via the touch panel, and
- wherein the method further comprises:
- encouraging the user to perform the tapping operation, using a predetermined number of fingers;
- obtaining a number of touch positions detected by the touch panel,
- comparing the predetermined number and the number of touch positions detected by the touch panel; and
- executing processing for restraining the tapping operation from being set as the type of operation which the user performs via the touch panel, based on a result of the comparing.

* * * * *